United States Patent
Christl et al.

(10) Patent No.: US 7,124,007 B2
(45) Date of Patent: Oct. 17, 2006

(54) SYSTEM FOR MONITORING THE INTERIOR OF A VEHICLE

(75) Inventors: Markus Christl, Tirschenreuth (DE); Ludwig Ertl, Regensburg (DE); Thorsten Köhler, Deuerling (DE); Dirk Zittlau, Stöckelsberg (DE)

(73) Assignee: Siemens Aktiengesellschaft, München (DE)

( * ) Notice: Subject to any disclaimer, the term of this patent is extended or adjusted under 35 U.S.C. 154(b) by 460 days.

(21) Appl. No.: 10/483,327

(22) PCT Filed: Jul. 9, 2002

(86) PCT No.: PCT/DE02/02514

§ 371 (c)(1),
(2), (4) Date: Jan. 12, 2004

(87) PCT Pub. No.: WO03/006279

PCT Pub. Date: Jan. 23, 2003

(65) Prior Publication Data

US 2004/0176891 A1    Sep. 9, 2004

(30) Foreign Application Priority Data

Jul. 10, 2001 (DE) .................. 101 33 512

(51) Int. Cl.
*B60R 21/231* (2006.01)
*B60R 21/16* (2006.01)
*G06F 17/00* (2006.01)

(52) U.S. Cl. ................ 701/45; 701/35; 701/46; 280/730.1; 702/129; 702/181

(58) Field of Classification Search .............. 701/45, 701/25, 46, 49, 1; 280/735, 730.1, 730.2; 180/272, 273; 340/665, 666, 667; 702/129, 702/181
See application file for complete search history.

(56) References Cited

U.S. PATENT DOCUMENTS

| 4,612,876 A | * | 9/1986 | Tigert ..................... 119/253 |
| 5,482,314 A | | 1/1996 | Corrado et al. |
| 5,602,425 A | * | 2/1997 | Wilhelmi et al. ........ 307/10.1 |
| 5,851,026 A | * | 12/1998 | Schoos et al. ............ 280/735 |
| 5,906,393 A | | 5/1999 | Mazur et al. |
| 5,999,893 A | * | 12/1999 | Lynch et al. ............. 702/181 |
| 6,027,138 A | | 2/2000 | Tanaka et al. |

FOREIGN PATENT DOCUMENTS

| DE | 198 41 399 A1 | 3/1999 |
| WO | WO 95/27635 | 10/1995 |
| WO | WO 98/49031 | 11/1998 |
| WO | WO 00/65538 | 11/2000 |
| WO | WO 01/14910 A2 | 3/2001 |

\* cited by examiner

*Primary Examiner*—Tan Q. Nguyen
(74) *Attorney, Agent, or Firm*—Morrison & Foerster LLP

(57) ABSTRACT

The invention relates to a system for monitoring the interior of a vehicle, wherein changes occurring in the occupancy of a seat, e.g. with a person P, a child seat K, an empty seat L, or an occupancy in another occupancy category, are effected in a computer unit by means of transitional probabilities which are externally specified to the monitoring system and which reflect the rapid speed at which a change in occupancy is taken into account by said monitoring system. As a result, an associated airbag or another safety device is activated or de-activated accordingly.

21 Claims, 1 Drawing Sheet

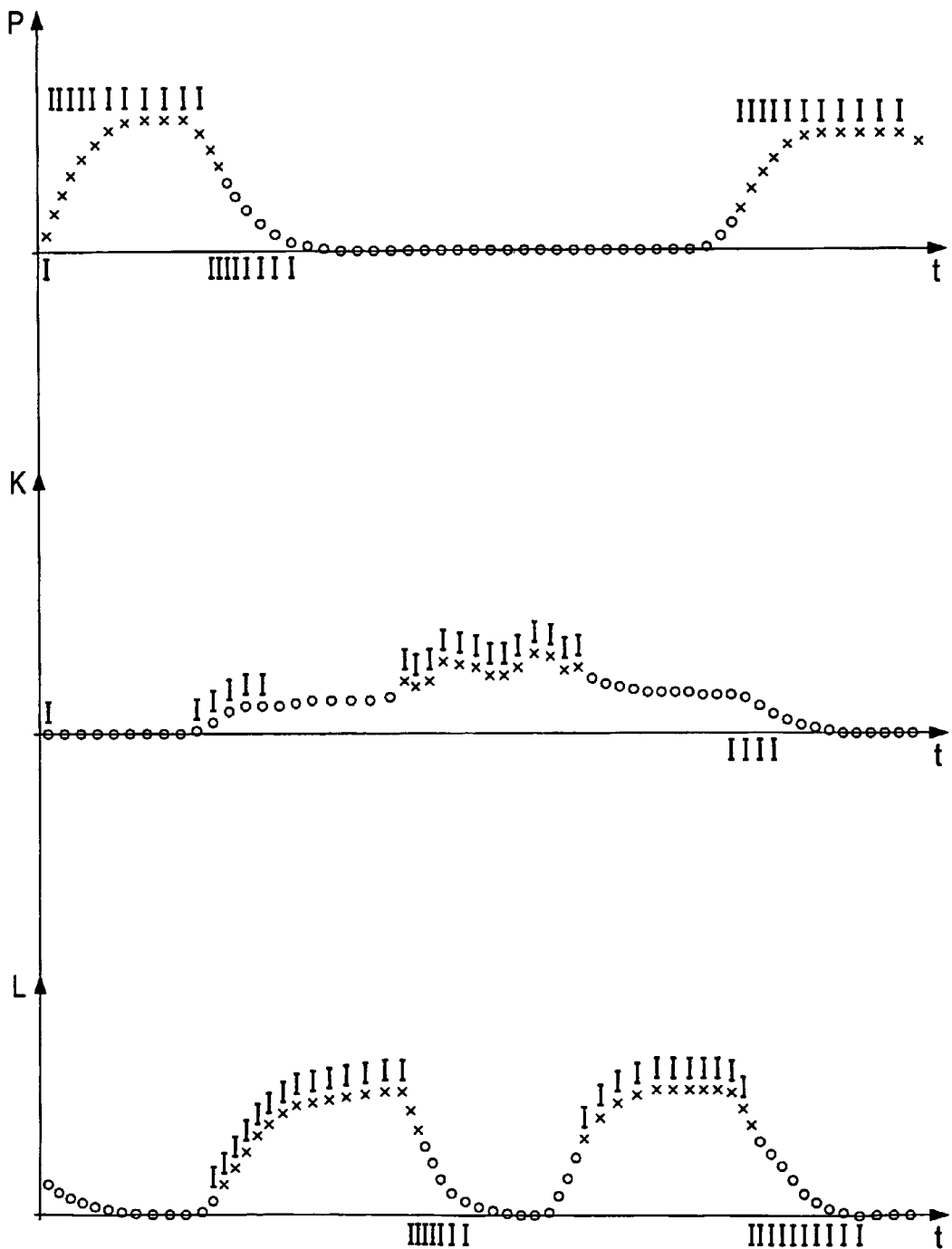

SYSTEM FOR MONITORING THE INTERIOR OF A VEHICLE

The invention relates to a system for monitoring the interior of a vehicle having a device for detecting data representing the occupancy state of a location in the interior of a vehicle and having a computing unit for obtaining association probabilities with respect to occupancy classes for the location in the interior of a vehicle with the aid of features representing the occupancy state of the location in the interior of a vehicle from measurement data of the device.

WO 00 65538 discloses a method and an apparatus for determining the position of an object in a vehicle. This method is based on the problem that airbag systems in motor vehicles can lead to injuries to persons in individual cases. The reason for this is generally because the airbag system does not have reliable information about the position of the passenger. The inflation operation is designed for extreme situations, i.e. an adult with seatbelt fastened must not come through to the dashboard in the event of an accident. However, if the passenger's head is too close to the dashboard at the instant of inflation (out-of-position), then this design of the airbag system can lead to severe injuries. Numerous systems which are intended to remedy this problem are in development. By way of example, attempts are being made, with the aid of laser triangulation systems, to measure average distances in the vehicle interior respectively examined, if appropriate also with the assistance of ultrasound, in order to determine the position of the passenger, in particular his head, therefrom. Besides optical and acoustic systems, use is also made of those systems which operate with sensors and determine the weight loading on the passenger seat. An even higher degree of safety can be achieved by combining various detection systems.

The same measurement methods can also be used to determine the occupancy of other seats in the vehicle, for example of the rear seats. With even further generalization, a measurement method of this type can also be utilized to determine the occupancy of a parcel shelf.

The measurement system is part of a monitoring system which is additionally equipped with a device for detecting the occupancy state of a seat, in particular of the passenger seat, or else of a plurality of seats or regions within the vehicle. The triggering decision of the airbag control unit is influenced depending on the detected occupancy state. The occupancy state is represented with the aid of so-called occupancy classes. Each object within the vehicle which is detected by the monitoring system is allocated a discrete occupancy class. The occupancy classes are typically the following classes:

1. empty seat,
2. child seat, directed rearward,
3. child seat, directed forward,
4. adult,
5. child.

Both a coarser and a finer subdivision of the occupancy classes are conceivable. An assignment of a person or an object to one of the occupancy classes is effected on the basis of the features which are obtained by means of an evaluation algorithm in a computing unit. All of the features span a feature space whose dimension corresponds to the number of features.

If a current set of features falls within the region of a specific class in the feature space, then the occupancy state of the seat or of the region in the interior of a vehicle is represented in said feature space.

One problem consists in the fact that the classification, on account of technical limitations of the sensor systems, changes from one occupancy class to another or jumps back and forth between the occupancy classes even though the real occupancy state has not changed. This is the case particularly when the current features in the feature space lie in the vicinity of the interface between different occupancy classes and the features vary slightly on account of measurement inaccuracies.

In the known monitoring system, the further problem arises that, on account of technical limitations of the sensor system or the sensor systems, if two or more sensor systems are used in conjunction with one another, occupancy classes overlap in the feature space. An unambiguous assignment of the features only to a single occupancy class is not possible in this case.

The object of the invention is to remedy this.

According to the invention, in an apparatus of the type mentioned in the introduction, the object is achieved by virtue of the fact that the computing unit is connected to a memory in which are stored transitional probabilities between the occupancy classes in accordance with which transitions occur between the occupancy classes.

The invention defines transitional probabilities in accordance with which transitions take place between the occupancy classes. The assignment to the occupancy classes is effected on the basis of association probabilities. These are possibilistic probabilities, i.e. the association with a class lies between 0 and 1, but the sum over all the association probabilities must not be 1 as in probabilistic probabilities. Possibilistic probabilities and classification methods based thereon are known, for example in neural networks, fuzzy clustering, vector support machines.

The core of the invention lies in the definition of the transitional probabilities between two occupancy classes. In this way, it is possible to control the number of measurement cycles within which the classification is permitted to jump from one occupancy class to another.

By way of example, the transition from "empty seat" to "adult" must be possible very rapidly since the airbag is typically deactivated in the case of an empty seat, but must be activated in the case of a person. Therefore, a high transitional probability from "empty seat" to "adult" must be provided. Conversely, it is critical if the airbag is disconnected for a person because the classification result temporarily jumps to "empty seat". The transition from "adult" to "child seat" is likewise critical since the airbag is triggered in the case of the adult, but not in the case of a child seat mounted on the seat. A transition must be permitted in this case too. However, transitional probability must be low, so that a transition can indeed take place after a plurality of corresponding measurement cycles. The low transitional probability thus incorporates a high degree of safety which prevents an interruption of the function of the airbag in the case of an adult.

The invention likewise relates to a generic system for monitoring the interior of a vehicle which is characterized in that a threshold value is defined, and in that the features are allocated to an occupancy class only when they lie above the threshold value.

The assignment to an occupancy class is effected on the basis of the following rules: the association with said assignment class is the highest. Preferably, the association additionally lies above a threshold value introduced according to the invention, which threshold value may be prescribed for the computing unit during the implementation of the computational algorithm. The interface between two occupancy classes in the feature space lies precisely where the possible association probabilities of a set of features assume the same value.

No classification result is output for regions in which the association probabilities with respect to all the occupancy classes lie below the threshold values or in which the association probabilities with respect to two occupancy classes assume the same value. Consequently, a further occupancy class can be introduced: 6. no classification possible. This implementation eliminates the further problem, namely the overlapping of regions of different occupancy classes.

Advantageous developments of the invention emerge from the subclaims.

The invention can advantageously be used particularly when the monitoring system is additionally equipped with a switch or a sensor for detecting the opening state of at least one door of the vehicle. The computing unit is then connected to the switch or the sensor via a data line. Depending on whether one or more doors are open or closed, the computing unit receives this information. An algorithm according to which the transitional probabilities can be set in a manner dependent on when the door was last opened is available in the computing unit. In this way, a suitable transitional probability between two occupancy classes is prescribed even when, after the closing of the door, the monitoring system is reactivated after a reset and no data from the past are available for obtaining suitable transitional probabilities. In order that suitable transitional probabilities are also available for the monitoring system upon the first activation of the monitoring system or after a reset, they are prescribed for the computing unit, so that the latter uses these prescribed transitional probabilities after the closing of the vehicle door has been identified. In this way, in this situation, too, the monitoring system can react rapidly to a real change in the occupancy state, for example when a person gets out and places a child seat onto the passenger seat.

It is particularly advantageous if the transitional probabilities are stored in the memory as matrix elements.

In one design of the invention, the transitional probabilities are expressed by numerical values which embody the number of classification cycles after which a change in an occupancy state from one occupancy class to another occupancy class is deemed to have occurred. As an alternative, transitional probabilities are stored in the matrix as digits between 0 and 1.

In the case of n occupancy classes, an n×n matrix is defined in which the transitional probabilities are combined. In this case, a transitional probability into each possible target state, i.e. the new classification result, is defined for each possible starting state, i.e. the current classification result.

The transitional probabilities are oriented to the frequency—to be expected in practice—of the corresponding state changes taking account of the criticality of this transition with regard to the influencing of the airbag triggering behavior. By way of example, a transition from the occupancy class "child seat directed rearward" to the class "child seat directed forward" is to be classified as rather uncritical since the airbag is deactivated for both classification results.

The invention likewise relates to a method for monitoring the interior of a vehicle, data representing the occupancy state of a location in the interior of a vehicle being measured, and association probabilities with respect to occupancy classes for a selected location in the interior of a vehicle being obtained with the aid of features representing the occupancy state of a location in the interior of a vehicle from measured data. The method according to the invention is characterized transitional probabilities between the occupancy classes in accordance with which transitions occur between the occupancy classes are determined.

In this case, in one development, the transitional probabilities are defined according to how probable the transition is considered to be. This can be determined experimentally, for example.

However, the transitional probabilities may also be defined according to how reliably the association probabilities are obtained. If, on account of an inaccuracy of the measurement system, features which belong to an occupancy class cannot be defined with such high certainty for metrological reasons, this can be compensated for by correspondingly higher transitional probabilities with respect to other occupancy classes in which the association probabilities can be determined with higher certainty.

What is particularly suitable in the design of the monitoring system is defining the transitional probabilities according to how relevant they are to the safety of a person. That occupancy class in the case of which the airbag must be activated must therefore be furnished with a high transitional probability from another occupancy class to it and with a low transitional probability from it.

In another development of the invention, it is provided that the transitional probabilities are varied in a manner dependent on time or the movement state of the vehicle.

In an advantageous embodiment, the invention likewise encompasses a method in which the values for the association probabilities are smoothed with respect to time by averaging. The influence of measurement errors can likewise be alleviated by the calculation of the statistical average value of the classifications obtained last, i.e. by a smoothing of the values over time.

For this purpose, the classification results are stored over a specific period of time adapted to the problem. By comparison with the classifications obtained in the past, ambiguities in the association of a feature with respect to an occupancy class are then eliminated.

It is likewise advantageously possible to carry out a weighting of association probabilities which is referred to a period of time.

In this case, it is advantageous if current association probabilities are weighted more strongly in comparison with association probabilities determined earlier.

In this case, the weighting of the respectively current association probabilities can be individually influenced in comparison with the weighting of the historical association probabilities in a manner dependent on corresponding control parameters for each individual occupancy class.

In particular, in a manner dependent on the last classification result, it is possible to control the weighting of the current association probabilities in the individual occupancy class histories with the aid of the transitional probabilities described above.

This corresponds to a conditional probability for the occurrence of a new classification state under the conditions of the current classification state and the current class associations of the other classification results. As a result, it is possible, for example, to strengthen the average associations of occupancy classes which belong to the classification group of the current classification result (e.g. group of child seats), while the average associations of occupancy classes which do not belong to the classification group of the current classification result (e.g. group of adults) are weakened, as a result of which a transition from the classification state "child seat" to the classification state "adult" becomes more improbable.

According to the method of the invention, in an advantageous embodiment it is provided that, while the door is open, a safety device for protecting persons and/or objects in the interior of a vehicle remains deactivated. In particular, it is provided that an airbag remains disconnected as long as the door is open. This prevents an incorrect triggering of the airbag when the vehicle is at a standstill.

It accords with experience that, directly after the vehicle has been entered and the door of the vehicle has been closed, changes are still made in the occupancy of the seats of the vehicle; by way of example, a child seat is adjusted. This results in high transitional probabilities for transitions between the occupancy classes. Therefore, firstly, after the closing of a vehicle door or after the closing of all the vehicle doors, high transitional probabilities are permitted in the calculation of the occupancy classes by the computing unit. The transitional probabilities are lowered over the course of time, which accords with the fact that changes in the occupancy of the seats become more improbable during the traveling duration.

This fact is also taken into account in an advantageous development of the method by virtue of the fact that an averaging is performed over results of classifications of an occupancy state with respect to-occupancy classes of the seat per occupancy class, the number of results which have an influence on the averaging being increased over the course of time. This results in an increasing smoothing of the values for the occupancy state.

As an alternative, it is possible for an adaptation of the transitional probability to be performed only for a specific, selected occupancy class, for example for the occupancy class "person sitting normally". As long as the classification "person sitting normally" is not performed over a specific period of time with a high probability, it is assumed that the object detected by the sensor is a child seat and the the occupancy class "child seat" is correspondingly allocated.

A further possibility in the adaptation of the transitional probabilities in a manner dependent on specific criteria consists in the stability of the classification result being taken into account: if the classification result and the corresponding association probabilities have settled to a stable classification state, the transitional probabilities are adapted, so that the stabilized classification state can no longer be disturbed by temporary fluctuations in the association probabilities.

In generalized fashion, this means that the transitional probabilities between occupancy classes are adapted in a manner dependent on fluctuations in the association probabilities.

The invention is explained in more detail below in an exemplary embodiment with reference to the drawing. The single figure shows association values (o) of occupancy classes for an adult P, a child seat K and an empty seat L as a function of time t and classification results (x) which are obtained with the aid of a classification algorithm using a plurality of measured association values (I), the current values.

Said algorithm takes account of measurement results from the past and is thereby robust with respect to disturbances and sporadic incorrect classifications. In the case of an optical sensor system, the classification algorithm takes account of the current three-dimensional image obtained by a CMOS camera or a CCD camera and also consults the preceding three-dimensional images for decision-making purposes.

In this case, the illustration shows the functioning of the algorithm on the basis of a real seat occupancy sequence over the course of time t. Firstly, the seat is occupied by a person P, and then the person P leaves the seat (empty seat L). A child seat K is then placed onto the seat. Finally, the child seat is removed again; the seat is empty again (state L). At the end, the person P occupies the seat again.

During this temporal sequence, firstly P is identified by the camera, which leads to very high current values for P, and in contrast to low values for K and L. By means of the algorithm which includes the current values from the past, effective confidence values resulting from the respective current values are calculated as association values. By way of example, a weighted moving average method is used for this purpose. Therefore, in the figure, the effective value for P initially rises up to the level of the current values for P, while the effective values for K and L virtually decrease to 0.

For the determination of the effective classification result, only those effective values which are above a threshold value are used at the respective point in time. From these values, the resulting classification result is then determined as that class which has the highest effective value. On account of the high current values for P, after the camera and the monitoring system have been switched on, for example upon actuation of the ignition lock of the vehicle, the resulting classification result is available as early as after the second classification cycle.

After the person has got out, the effective value for L rises greatly, so that the empty seat is output as resulting classification result again as early as after two classification cycles.

At the point in time at which the child seat K is placed onto the seat, the effective value for L decreases virtually to 0, while the effective value for K rises, so that the resulting classification result is changed over very rapidly to K. When the child seat K is detected by the sensor system, greatly fluctuating current values are determined for K, but they are smoothed by means of the algorithm to form effective values which have only a small fluctuation range.

The transition phases between the different occupancy classes are controlled by adjustable transitional probabilities which can be represented in a matrix:

|   | L | K | P |
|---|---|---|---|
| L | 0.3 | 0.3 | 0.3 |
| K | 0.3 | 0.3 | 0.3 |
| P | 0.3 | 0.1 | 0.3 |

The numbers represent the transitional probabilities which are supposed to exist between the different occupancy states and which are prescribed for the computing unit. In this case, the occupancy classes L, K, P situated beneath one another in a column represent the initial occupancy classes, and L, K, P the occupancy classes toward which the change takes place. The numbers represent the reciprocals of the numbers of classification cycles which are necessary in order to undergo transition from one classification state to another classification state. Large matrix values thus represent high transitional probabilities, while small matrix values represent low transitional probabilities.

Since adults P can be classified very reliably and a sudden transition from P to a child seat K is very improbable, the low transitional probability 0.1 is inserted in the matrix for the transition from P to K. This is because a state change from P to K usually proceeds in such a way that the adult P leaves the seat and the latter is then empty. It is only then that the child seat K is placed onto the seat.

In another exemplary embodiment of the invention, the following matrix is is prescribed in the case of likewise only three occupancy classes for the transitional probabilities:

|   | L   | K   | P   |
|---|-----|-----|-----|
| L | 0.3 | 0.3 | 0.5 |
| K | 0.3 | 0.3 | 0.3 |
| P | 0.1 | 0.1 | 0.3 |

This takes account of the fact that a change from an empty seat L to an adult is intended to be performed rapidly in order to activate the airbag immediately. Therefore, a comparatively high transitional probability 0.5 is inserted here.

By contrast, a change from an adult to an empty seat L is to be performed carefully and slowly in order to ensure that the person P is protected, even when for example two or three erroneous measurements are made by the sensor system, which, in the case of an optical system, may be due for example to the fact that said person has bent forward to reach an object in the region of said person's feet, so that the upper part of the body has no longer been detected by the optical sensor system. Therefore, a transitional probability 0.1 is inserted here as well as toward the child seat K.

The transitional probabilities are either defined once by a matrix, as represented above; however, in another embodiment of the invention, they may also be variable with respect to time.

Events which alter the transitional probabilities between the occupancy classes, for example the closing or opening of a door, are taken into account over the course of time. Including the door state (open or closed) in the classification makes it possible to adapt the transitional probabilities between two occupancy classes to the events.

The opening state of a door or of a plurality of doors is detected by means of a door switch, for example a reed contact, a mechanical switch or a sensor, in particular by means of a two- or three-dimensional occupant monitoring system.

No classification takes place while the door is open. The airbag is intended to be deactivated in any event. After the closing of the door, transitions between the occupancy classes are very probable and become more and more improbable with increasing time.

The classification system connected to the computing unit is initially in the reset state. The airbag is deactivated during this time.

This prevents the classification system from being influenced by the head or upper part of the body of persons who lean into the vehicle interior in order, for example, to place a child seat onto the passenger seat or to fix it there, and erroneous classification results from occurring, which then leads via an assignment to an occupancy class that includes earlier classifications to a negative effect on the following classification process.

If the door has been closed, firstly, if the monitoring system is then switched on, transitions between the occupancy classes are very probable.

By way of example, a person leans forward toward the dashboard in order to remove an object from the glove box. In this case, the surface of the person corresponds to a child seat directed rearward, so that a 3D camera classifies the person as a child seat and the airbag is deactivated because a reclassification is performed by the monitoring system already on the basis of this single measurement result.

The person then leans back and takes up a normal seated position. The classification must then once again likewise be changed rapidly to "person" in order that the airbag is activated again. Therefore, it is necessary here to react very rapidly to an incorrect initial classification after the closing of the door.

In contrast to this, however, the classification "person" is intended to be maintained if the person leans forward after relatively long travel and the current classification result turns out to be "child seat".

Since a transition between two occupancy classes is less realistic with increasing time after the closing of the door, the transitional probabilities are also lowered correspondingly. The latter decrease for example proportionally to the time elapsed, or they are inversely proportional to time.

Such time-dependent transitional probabilities can be implemented in the following way:

1. The adaptation is effected over time, e.g. by increasing the number of the last classifications over which averaging is effected with each further classification.

2. The adaptation is limited only to the case "person sitting normally". As long as the classification "person sitting normally" is not effected over a specific period of time with a high probability, it is assumed that the object on the seat is a child seat. This means that an adaptation is made dependent on a high association probability with respect to the occupancy class having to have existed over a period of time—defined in the monitoring system—in the past in order that the monitoring system returns to said occupancy class.

3. The adaptation can also be effected by way of the stability of the classification result: if the classification result and the corresponding association probabilities have settled to a stable classification state, the transitional probabilities are adapted in such a way that the stabilized classification state can no longer be disturbed by temporary fluctuations in the association probability values.

The invention provides a system for monitoring the interior of a vehicle in which changes in the occupancy of a seat, for example with a person P, a child seat K, in the case of an empty seat L or in the case of occupancy in another occupancy class, are realized in a computing unit by means of transitional probabilities which are externally prescribed for the monitoring system and which represent the rapidity with which a change in the occupancy is taken into account by the monitoring system. What is then dependent thereon is the fact of whether an associated airbag or another safety device is activated or deactivated for the respective seat.

The invention claimed is:

1. A system for monitoring the interior of a vehicle having a device for detecting data representing the occupancy state of a location in the interior of a vehicle and having a computing unit for obtaining association probabilities with respect to occupancy classes for a selected location in the interior of a vehicle with the aid of features representing the occupancy state of a location in the interior of a vehicle from measurement data of the device, characterized in that the computing unit is connected to a memory in which are stored transitional probabilities between the occupancy classes in accordance with which transitions occur between the occupancy classes.

2. The monitoring system as claimed in claim 1, characterized
in that a threshold value is defined, and in that the features are allocated to an occupancy class only when they lie above the threshold value.

3. The monitoring system as claimed in claim 1, characterized in that the monitoring system is equipped with a switch or sensor for detecting the opening state of at least one door of the vehicle, in that the computing unit.

4. The monitoring system as claimed in claim 3, characterized in that the transitional probabilities between the occupancy classes can be set in a manner dependent on the opening state of the door by the computing unit by means of an algorithm.

5. The monitoring system as claimed in claim 1, characterized in that the transitional probabilities are stored in the memory as matrix elements.

6. The monitoring system as claimed in claim 1, characterized in that the transitional probabilities are numerical values which embody the number of classification cycles after which a change in an occupancy state from one occupancy class to another occupancy class is deemed to have occurred.

7. A method for monitoring the interior of a vehicle, data representing the occupancy state of a location in the interior of a vehicle being measured, and association probabilities with respect to occupancy classes for a selected location in the interior of a vehicle being obtained with the aid of features representing the occupancy state of a location in the interior of a vehicle from measured data, characterized
in that transitional probabilities between the occupancy classes in accordance with which transitions occur between the occupancy classes are determined.

8. The method as claimed in claim 7, characterized in that the transitional probabilities are defined according to how probable the transition is considered to be.

9. The method as claimed in claim 7, characterized in that the transitional probabilities are defined according to how reliably the association probabilities are obtained.

10. The method as claimed in claim 7, characterized in that the transitional probabilities are defined according to how relevant they are to the safety of a person.

11. The method as claimed in claim 7, characterized in that the transitional probabilities are varied in a manner dependent on time or the movement state of the vehicle.

12. The method as claimed in claim 7, characterized in that the values for the association probabilities are smoothed with respect to time by averaging.

13. The method as claimed in claim 12, characterized in that by a weighting of association probabilities which is referred to a period of time is carried out.

14. The method as claimed in claim 13, characterized in that current association probabilities are weighted more strongly in comparison with association probabilities determined earlier.

15. The method as claimed in claim 7, characterized in that the transitional probabilities are defined in a manner dependent on the opening state of a door of the vehicle.

16. The method as claimed in claim 15, characterized in that, while the door is open, a safety device for protecting persons and/or objects in the interior of a vehicle remains deactivated.

17. The method as claimed in claim 15, characterized in that an airbag remains deactivated as long as the door is open.

18. The method as claimed in claim 15, in that, after the closing of the door, high transitional probabilities are permitted for transitions between the occupancy classes, and in that the transitional probabilities are lowered over the course of time.

19. The method as claimed in claim 18, characterized in that an averaging is performed over results of classifications of an occupancy state with respect to occupancy classes of the seat per occupancy class, the number of results which have an influence on the averaging being increased over the course of time.

20. The method as claimed in claim 18, characterized in that an averaging is performed over results of a classification of an occupancy state with respect to the occupancy class "person sitting normally", and in that, if an assignment to the occupancy class "person sitting normally" is not performed over a predetermined period of time with a high association probability, the seat is allocated the occupancy class "child seated".

21. The method as claimed in claim 18, characterized in that the transitional probabilities between occupancy classes are adapted in a manner dependent on fluctuations in the association probabilities.

* * * * *